United States Patent [19]

Yoneyama et al.

[11] Patent Number: 5,506,618
[45] Date of Patent: Apr. 9, 1996

[54] SOLID-STATE IMAGE PICKUP DEVICE USING AN ALL-PIXEL CONCURRENT READ-OUT TYPE IMAGE SENSOR AND COLOR FILTER ARRAY

[75] Inventors: Masayuki Yoneyama, Takatsuki; Yasutoshi Yamamoto, Katano; Norio Suzuki, Neyagawa; Hiroaki Okayama, Hirakata; Syusuke Ono, Takatsuki, all of Japan

[73] Assignee: Matsushita Electric Industrial Co., Ltd., Osaka, Japan

[21] Appl. No.: 62,440

[22] Filed: May 13, 1993

[30] Foreign Application Priority Data

May 13, 1992 [JP] Japan .................................. 4-120238
Aug. 21, 1992 [JP] Japan .................................. 4-222426

[51] Int. Cl.⁶ .................................................. H04N 9/07
[52] U.S. Cl. ........................... 348/234; 348/279; 348/322
[58] Field of Search ................................ 358/36, 37, 39, 358/40, 43, 44, 48, 49; 348/320–324, 279, 235; H04N 9/07

[56] References Cited

U.S. PATENT DOCUMENTS

| | | | |
|---|---|---|---|
| 4,246,601 | 1/1981 | Sato et al. | 358/47 |
| 4,876,591 | 10/1989 | Muramatsu | 358/43 |
| 5,119,180 | 6/1992 | Okamoto | 358/48 |
| 5,298,734 | 3/1994 | Kokubo | 348/322 |

FOREIGN PATENT DOCUMENTS

| | | | |
|---|---|---|---|
| 63-199590 | 8/1988 | Japan | H04N 9/07 |
| 63-222594 | 9/1988 | Japan | H04N 9/07 |
| 1-53688 | 3/1989 | Japan | H04N 9/07 |
| 4009915 | 1/1992 | Japan | H04N 9/07 |
| 4-72989 | 3/1992 | Japan | H04N 9/07 |
| 4-79592 | 3/1992 | Japan | H04N 9/07 |
| 492590 | 3/1992 | Japan | H04N 9/07 |
| WO91/12688 | 8/1991 | WIPO | |

OTHER PUBLICATIONS

07/943,393, Sep. 10, 1992, H. Okayama et al. (U.S. Patent Application).

Primary Examiner—James J. Groody
Assistant Examiner—Cheryl Cohen
Attorney, Agent, or Firm—Ratner & Prestia

[57] ABSTRACT

A solid state image pickup device having a high luminance signal resolution in both horizontal and vertical directions using only one CCD is realized. It is so arranged as to make light incident upon and passed through a fixed complementary color filter array subjected to a photoelectric conversion with an all-pixel concurrent readout photoelectric conversion means and fed to a luminance signal processing unit and a chrominance signal processing unit through an H memory unit to develop a luminance signal together with a first and a second chrominance signals at output terminals.

5 Claims, 10 Drawing Sheets

SOLID-STATE IMAGE PICKUP DEVICE USING AN ALL-PIXEL CONCURRENT READ-OUT TYPE IMAGE SENSOR AND COLOR FILTER ARRAY

BACKGROUND OF THE INVENTION

1. Field of the Invention

The present invention relates to a solid-state image pickup device such as a video camera and the like having a photoelectric conversion unit.

2. Description of the Prior Art

In recent years, there have been widely used solid-state image pickup devices as image pickup devices such as video cameras and the like. A solid-state image pickup device has various advantages of being light in weight and compact, having a uniform spatial resolution throughout a whole part of a screen and low in afterimage and so on. However, as there is an increasing need for high image quality through such as EDTVs and HDTVs and removal of false signals represented by moire patterns such as beat noises, enhancement of high resolution is still a problem to be solved.

FIG. 2(a) shows a block diagram of a conventional solid-state image pickup device. FIG. 2(b) shows a color filter array 46 in the conventional solid-state image pickup device, in which the first row is a repetition of magenta (Mg) and green (G), the second row is a repetition of yellow (Ye) and cyan (Cy), the third row is a color filter arrangement in the reverse order to that of the first row, and the fourth row is a color filter arrangement same as that of the second row.

Referring to FIGS. 2(a) and 2(b), incident light passing through the color filter array 46 is subjected to photoelectric conversion in a photoelectric conversion unit 40. The output signal of the photoelectric conversion means 40 is developed with electric charges on the first and second rows added and, likewise, the electric charges on the third and fourth rows added in a first field. In a second field, electric charges on the second and third rows are added and developed. In the photoelectric conversion unit 40, a photodiode mix (PDMIX) is performed by usually adding two vertical pixels to read out electric charges. For example, in FIG. 2(b), an interlace scanning system is adopted in such a manner that the first and second rows as well as the third and fourth rows are added together to be developed in the first field whereas the second and third rows as well as the fourth and fifth rows are added to be developed in the second field.

The output signal of the photoelectric conversion unit 40 is fed to a luminance signal processing unit 41 and a chrominance signal processing unit 42. In the luminance signal processing unit 41, adjacent horizontal signals are added together to thereby produce a luminance signal to be generated at a first output terminal 43. In the chrominance signal processing unit 42, adjacent horizontal signals are subtracted to each other to thereby produce a first color difference signal such as a B-Y signal to be generated at a second output terminal 44 and a second color difference signal such as a R-Y signal to be generated at a third output terminal 45.

Although the conventional solid-state image pickup device has such an advantage as mentioned above that the signal processing is simple, there is a problem that it is insufficient for providing a good resolution with removal of a moire pattern.

FIG. 9(c) shows a two-dimensional frequency characteristic obtained when the conventional solid-state image pickup device is used. In FIG. 9(c), the horizontal axis and vertical axis represent a horizontal frequency and vertical frequency, respectively. As shown in FIG. 9(c), the moire pattern will occur at coordinates of (Nyquist, 0 line), (Nyquist, 250 lines), (Nyquist, 500 lines), (0, 250 lines), and (0, 500 lines). It is to be noted here that Nyquist denotes a frequency ($\frac{1}{2} \times f_s$), where $f_s$ represents a sampling frequency.

Moreover, with respect to the horizontal Nyquist frequency, the horizontal luminance signal band is degraded to 0.85 times because it is limited in band width by means of an optical low-pass filter such as a crystal filter and further because adjacent horizontal signals are added to thereby produce a luminance signal in the luminance signal processing procedure. As to the vertical luminance signal, there is also a problem that only a resolution as fine as 350 lines can be obtained after interlace scanning because a vertical resolution of 500 lines is limited in band width by means of an optical low-pass filter and further because adjacent vertical pixels are added in the photoelectric conversion unit 40.

SUMMARY OF THE INVENTION

Therefore, an essential objective of the present invention is to provide a solid-state image pickup device having a high luminance signal resolution in both horizontal and vertical directions using a single CCD (charge coupled device), solving the problems mentioned above.

In order to achieve the objective mentioned above, the solid-state image pickup device of the present invention comprises:

color filter means having such a color filter array composed by repetition of four rows that a N-th row is composed of a repetition of a first color filter and a second color filter, a (N+1)th row is composed of a repetition of a third color filter and a fourth color filter, a (N+2)th row is composed of a repetition of a second color filter and a first color filter as a reverse sequence to that of the N-th row in pixel arrangement, a (N+3)th row is composed of a repetition of a fourth color filter and a third color filter as a reverse sequence to that of a (N+1)th row in pixel arrangement, the four rows being disposed repetitively in the vertical direction;

photoelectric conversion means of all-pixel read-out type for photo-electrically converting incident light data signals input passing through said color filter means;

memory means for storing the photo-electrically converted signals output from said photoelectric conversion means;

luminance signal processing means for producing a luminance signal from the output signal of said memory means to be generated from a first output terminal (5) of said device; and chrominance signal processing means for producing a first and second chrominance signals from the output signal of said memory means to be respectively generated from a second and third output terminals of said device.

According to the present invention, a solid state image pickup device having a high luminance signal resolution in both horizontal and vertical directions using a single CCD is realized. It is so arranged as to make light incident upon and passed through a fixed complementary color filter array subjected to a photoelectric conversion with an all-pixel concurrent readout photoelectric conversion means and fed to a luminance signal processing unit and a chrominance signal processing unit through an H memory unit to develop a luminance signal together with a first and a second chrominance signals at output terminals.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENTS

With reference to the drawings, the following describes an embodiment of a solid-state image pickup device according to the present invention.

Figure 1A:
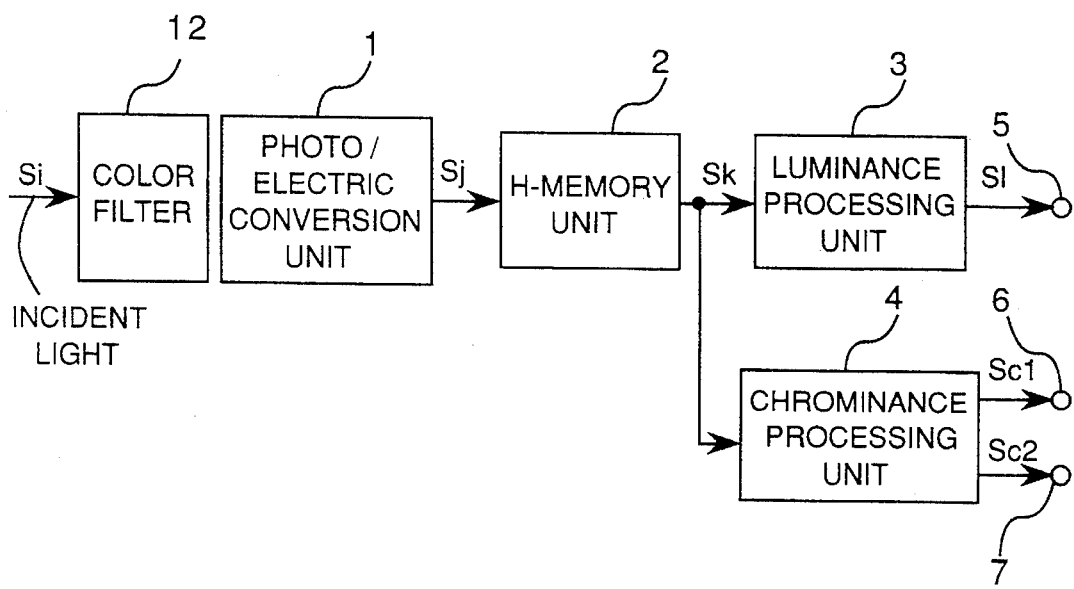
FIG. 1(a) is a block diagram showing an embodiment of a solid-state image pickup device according to the present invention.
Figure 1B:
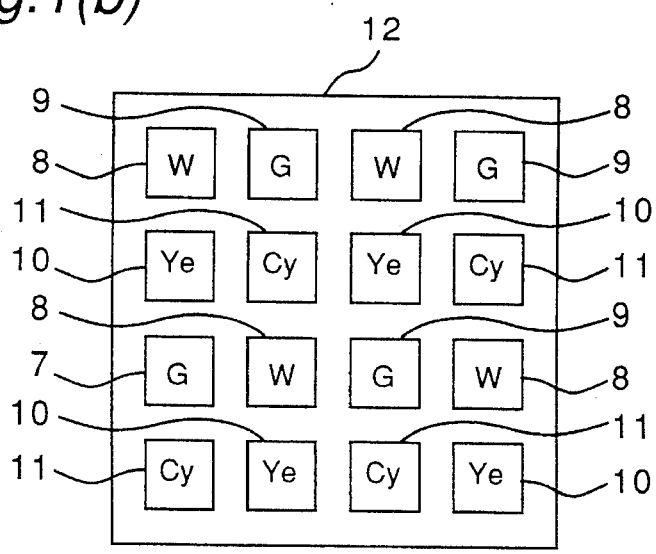
FIG. 1(b) is a model view showing an example of a color filter array of the solid-state image pickup device according to the present invention.

FIG. 1(a) shows a construction of an embodiment of a solid-state image pickup device according to the present invention and FIG. 1(b) shows a model of a color filter array adopted in the image pickup device of FIG. 1(a).

Referring to FIG. 1(a), reference numeral 1 denotes a photoelectric conversion unit of an all-pixel concurrent read-out type (or progressive-scan type) for converting optical data signals into electrical data signals to generate output signals of the all pixels concurrently. Reference numeral 2 denotes an H memory unit for storing electrical data signals, reference numeral 3 denotes a luminance signal processing unit for generating luminance signals, reference numeral 4 denotes a chrominance signal processing unit for generating chrominance signals, and reference numeral 12 denotes a color filter array. An incident light signal Si passing through the color filter array 12 is subjected to a photoelectric conversion by means of the photoelectric conversion unit 1 of an all-pixel concurrent read-out type. The output signals Sj of the all pixels concurrently read out of the photoelectric conversion unit 1 are independently and simultaneously generated within one field and applied to the H memory unit 2 in which the photo-electrically converted signals Sj are stored. The output of the H memory unit 2 is electrically connected not only to the luminance signal processing unit 3 but also to the chrominance signal processing unit 4.

As such a photoelectric conversion unit 1 of an all-pixel concurrent read-out type mentioned above, there may be used any one disclosed in the Television Society Technical Report [Vol. 13, No. 11, pp. 79–84, TEBS '89–14, ED '89–18 (in February 1989)], for example.

Figure 9A:
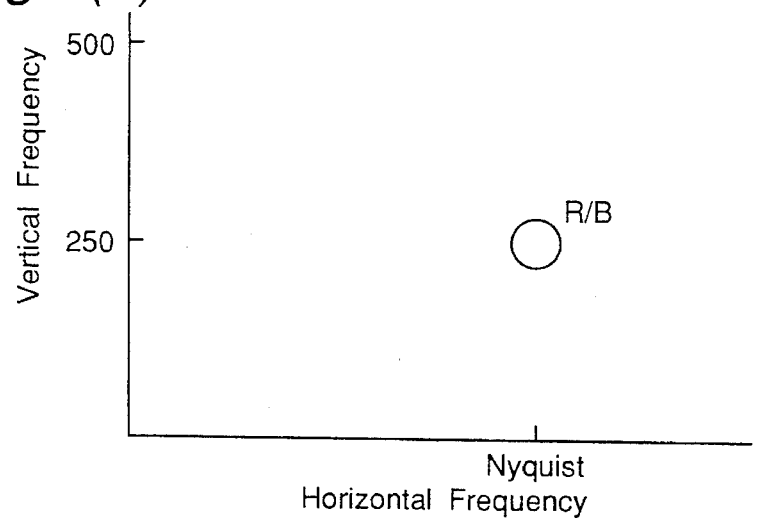
FIG. 9(a) is a view showing a two-dimensional frequency characteristic of moire occurrence condition in the color filter array shown in FIG. 6.

In the color filter array 12 shown in FIG. 1(b), there is produced only a very simple moire pattern as shown in FIG. 9(a) which results in an improved image quality.

As to one example of the color filter array 12 shown in FIG. 1(b), four kinds of color filters are used, that is, white one (W) is used as a first color filter 8, green one (G) as a second color filter 9, yellow one (Ye) as a third color filter 10, and cyan one (Cy) as a fourth color filter 11. As shown in FIG. 1(b), the first row is a repetition of white (W) and green (G), the second row is a repetition of yellow (Ye) and cyan (Cy), the third row is a repetition in the reverse order to that of the first row, and the fourth row is a repetition in the reverse order to that of the second row.

Figure 3:
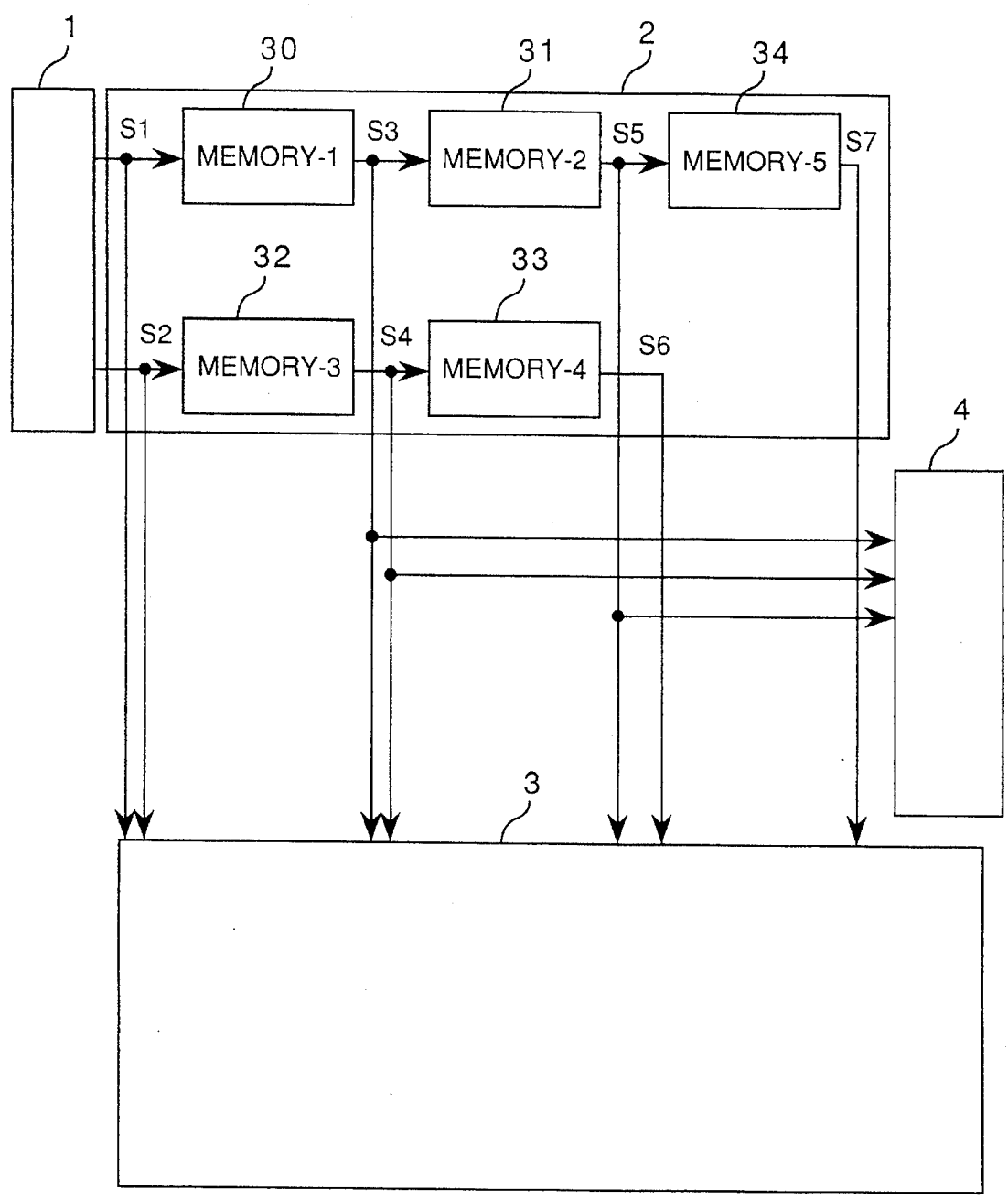
FIG. 3 is a block diagram showing a construction of an H memory unit of the present embodiment.

FIG. 3 shows an example of the H memory unit 2 which includes at least four 1H memories 30 through 33, in this example, the unit 2 further includes a fifth 1H memory 34 in addition. It is to be noted here that a 1H memory means a FIFO memory corresponding to one horizontal scan period of a television signal.

Referring to FIG. 3, the first, second and fifth 1H memories 30, 31 and 34 are electrically connected in series while the third and fourth memories 32 and 33 are electrically connected in series. As shown in FIG. 3, two output signal lines S1 and S2 of the photoelectric conversion unit 1 are respectively connected to the inputs of the first and second memories 30 and 32. The first and second memories 30 and 31 has their inputs (S1, S2) and outputs (S3, S4) respectively connected to the luminance signal processing unit 3. The first and third memories 30 and 32 are respectively connected in series to the second and fourth memories 31 and 33 having their outputs (S5, S6) connected to the luminance signal processing unit 3, while the outputs (S3, S4, S5) of the first, second and third memories 30, 31 and 32 are also respectively connected to the chrominance signal processing unit 4.

Also, it is preferable to provided the fifth 1H memory 34, where the output (S5) of the second 1H memory 31 is connected to the input of the fifth 1H memory 34 having its output (S7) connected to the luminance signal processing unit 3.

In more detail, among the output signals (Sj) of photoelectric conversion unit 1, the first signal S1 representing the even number pixel rows is fed to the first 1H memory 30, and then the output signal S3 of the first 1H memory 30 is fed to the second 1H memory 31, while the second signal S2 representing the odd number rows is fed to the third 1H memory 32, and then the output signal S4 of the third 1H memory 32 is fed to a fourth 1H memory 33. The signal S1 applied to the first 1H memory 30 and the output signal S3 generated from the first 1H memory 30 together with the output signal S5 generated from the second 1H memory 31, the input signal S2 applied to the third 1H memory 32, the output signal S4 generated from the third 1H memory 32 and the output signal S6 generated from the fourth 1H memory 33 are fed to the luminance signal processing unit 3, while the signals S3, S4 and S5 are fed to the chrominance signal processing unit 4.

Otherwise, as shown in FIG. 3, the H memory unit 2 may be so constructed that the output signal S5 of the second 1H memory 31 is fed to the fifth 1H memory 34 and then fed to the luminance signal processing unit 3, thereby allowing an interlace processing. That is, for example, the H memory unit 2 may be constructed in such a manner that the signals S1 through S6 are used as the video signals of an odd number field, while the signals S2 through S7 are used as the video signals of an even number field.

Referring back to FIG. 1, after the output signals Sk of the H memory unit 2 have been fed to the luminance signal processing unit 3 and the chrominance signal processing unit 4, a luminance signal S1 is produced by means of the luminance signal processing unit 3 to be generated from a first output terminal 5. In the chrominance signal processing unit 4, a first and a second chrominance signals Sc1 and Sc2 are produced and output from a second and third output terminals 6 and 7, respectively.

Figure 4:
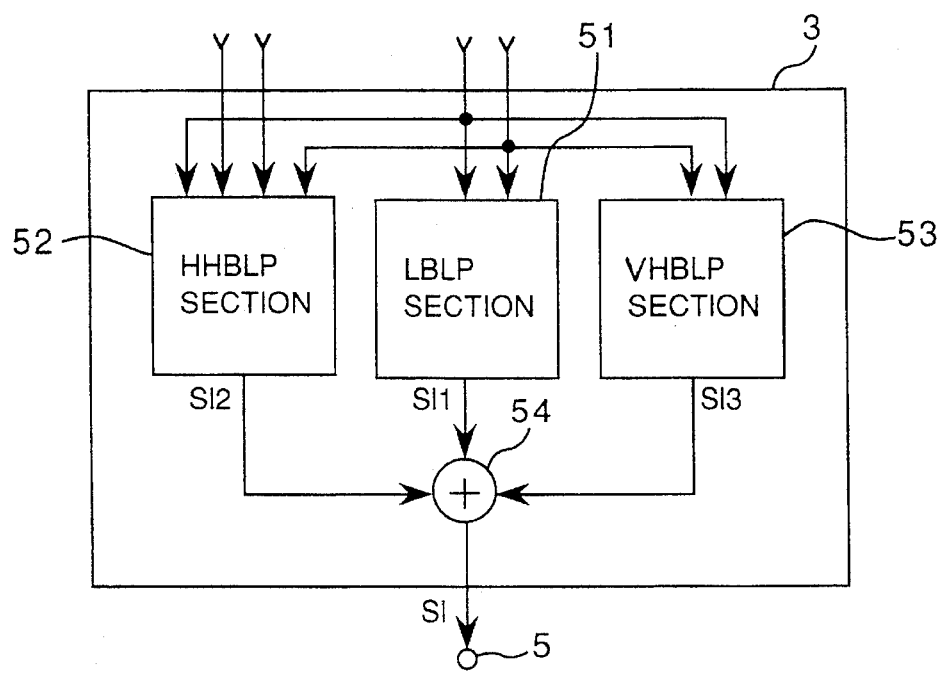
FIG. 4 is a block diagram showing a construction of a luminance signal processing unit of the solid-state image pickup device of the present embodiment.

FIG. 4 shows an example of a construction the luminance signal processing unit 3. As shown in FIG. 4, the luminance signal processing unit 3 has a low frequency band luminance signal producing (LBLP) section 51, a horizontal high frequency band luminance signal producing (HHBLP) section 52, a vertical high frequency band luminance signal producing (VHBLP) section 53, and an adder 54. In the low frequency band luminance signal producing (LBLP) section 51, the signals from pixels vertically and horizontally adjoining are added together and the resultant output signal S11 thereof is fed to the adder 54. The horizontal high frequency band luminance signal producing (HHBLP) section 52 extracts a horizontal high frequency component which is obtained by adding signals of M pixels vertically adjoining, and the resultant output signal S12 thereof is fed to the adder 54. The vertical high frequency band luminance signal producing (VHBLP) section 53 extracts a vertical high frequency component which is obtained by adding signals of K pixels horizontally adjoining, and the resultant output signal S13 thereof is fed to the adder 54. The resultant output signal S1 of the adder 54 is then generated from the output terminal 5 as a luminance signal.

Figure 5:
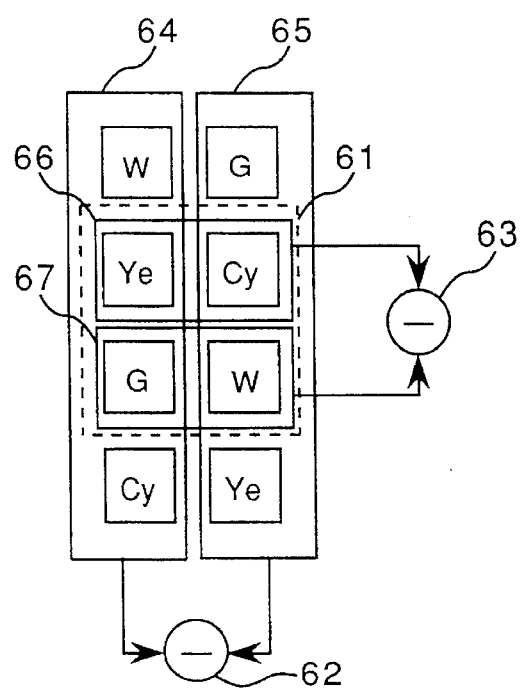
FIG. 5 is a conceptual view showing an operational function of the luminance signal processing unit of FIG. 4.

FIG. 5 shows a concept of an operation of a luminance signal processing performed by the luminance signal processing unit 3 shown in FIG. 4. In the case where four kinds of color filters are disposed in such an arrangement as shown in FIG. 5, the low frequency band luminance signal S11 is produced by the signals of four pixels Ye, Cy, G and W enclosed within a dotted line area 61. The horizontal high frequency band luminance signal S12 is produced by subtracting between an added signal of four vertically adjoining pixels W, Ye, G and Cy enclosed within an area 64 and an added signal of four vertically adjoining pixels G, Cy, W and Ye enclosed within an area 65, where the subtracting operation is performed by means of a subtracting unit 62.

The vertical high frequency band luminance signal S13 is produced by subtracting between an added signal of two horizontal pixels Ye and Cy enclosed within an area 66 and an added signal of two horizontal pixels G and W enclosed within an area 67, where the subtracting operation is performed by means of a subtracting unit 63.

The horizontal high frequency band luminance signal S12 is produced by subtracting operation is performed by a S17, where the subtracting between S16 and subtractor 62. The signal S16 is produced by adding signals of four vertically adjoining pixels W, Ye, G and Cy enclosed within an area 64. Adding operation is performed by an adder 84. The signal S17 is produced by adding signals for four vertically adjoining pixels G, Cy, W and Ye enclosed within an area 65, where the adding operation is performed by an adder 85.

The chrominance signal processing unit 4 is so constructed that a first and second color difference signals or a first and second primary colors can be obtained simultaneously in the current field by arithmetic operations between adjoining pixels.

Figure 11:
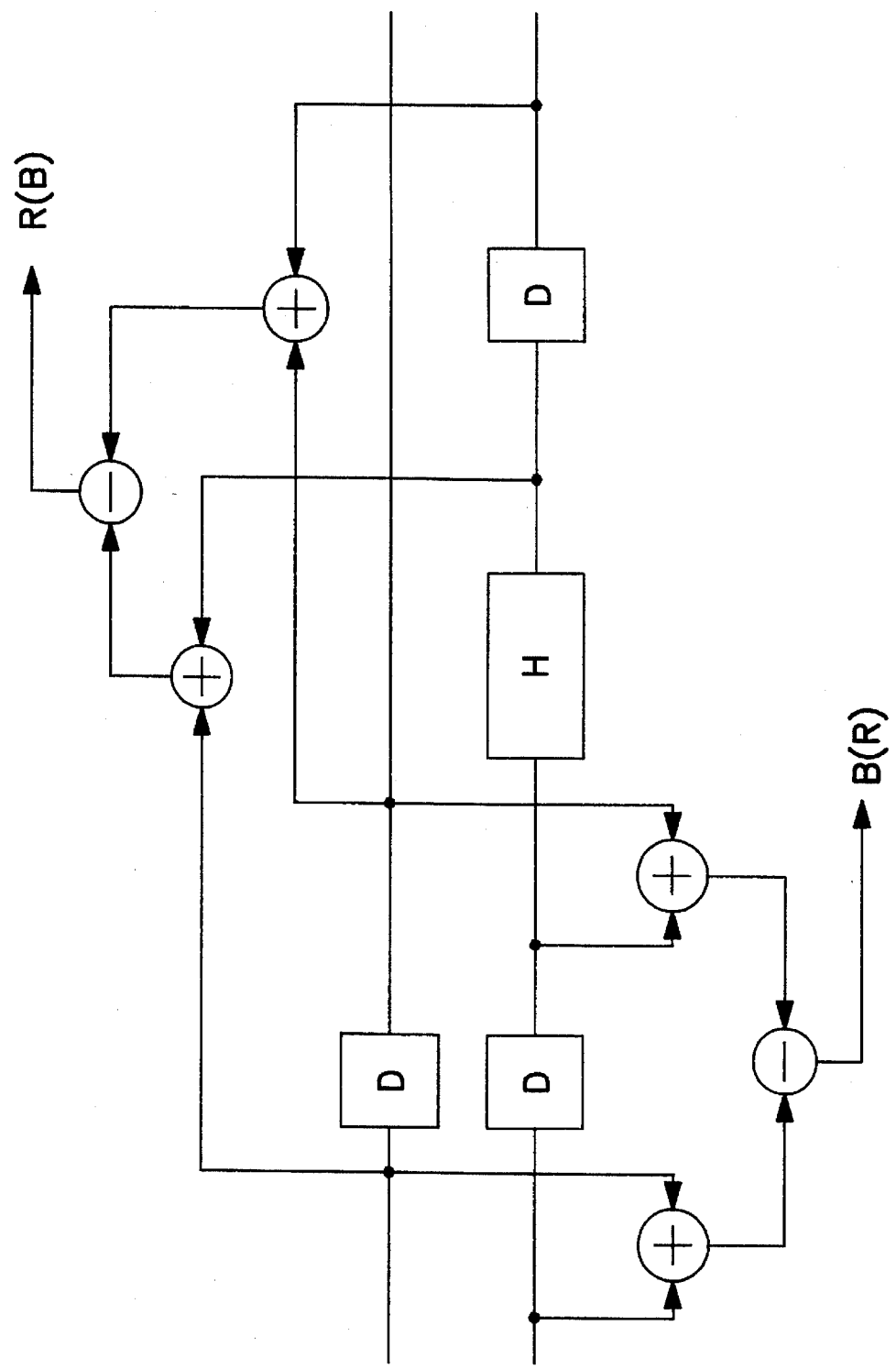
FIG. 11 is a block diagram showing a construction of a chrominance signal processing unit of FIG. 1(a).

FIG. 11 shows an example of a construction of the chrominance signal processing unit 4, where three D-flipflops (each represented by "D") are provided.

Figure 6:
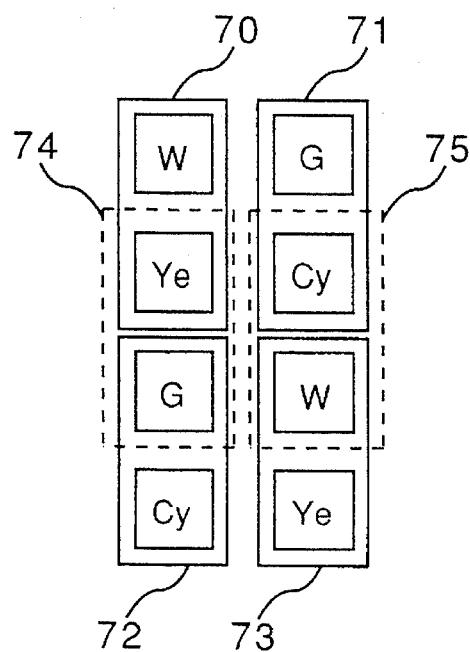
FIG. 6 is a conceptual view showing an operational function of a chrominance signal processing unit in the solid-state image pickup device of the present embodiment.

FIG. 6 shows a concept of a chrominance signal processing operation of the chrominance signal processing unit 4 shown in FIG. 11. As shown in FIG. 6, a red signal R is produced by subtracting between an added signal obtained from the signals of pixels W and Ye enclosed within an area 70 and an added signal obtained from the signals of pixels G and Cy enclosed within an area 71.

Likewise, a −R signal is produced by subtracting an added signal obtained from the signals of pixels G and Cy enclosed within an area 72 and an added signal obtained from the signals of pixels W and Ye enclosed within an area 73. By subtracting the −R signal from the R signal and demodulating the carrier of (Nyquist, 250 lines) shown in FIG. 9(a), the R signal is obtained.

In addition, since the solid-state image pickup device of the present invention utilizes an all-pixel read-out type photoelectric conversion unit, a B signal is produced by subtracting between an added signal obtained from pixels Ye and G within an area 74 and an added signal obtained from pixels Cy and W within an area 75 in the current field, and likewise, a −B signal is obtained in a similar manner. Because the R and B signals are obtained simultaneously, no color split is caused, thus an excellent image pickup characteristic can be realized.

When the color filter array is changed, the functions related to luminance and chrominance mentioned above may be performed by a similar signal processing depending on the change of the color filter array. As a result, moire patterns can be completely removed in both luminance and chrominance while a single plate is utilized. Although M=4 as the number of the vertically adjoining pixels and K=2 as the number of the horizontally adjoining pixels have been selected for the pixel adding range in the above embodiment, any figures greater than M=2 and K=2 may also be selected.

Figure 8A:
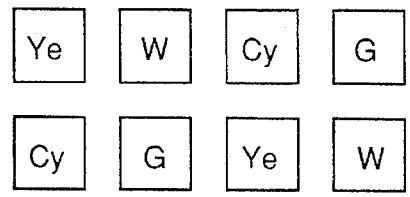
FIG. 8(a) is a model view showing an example of the color filter array of the solid-state image pickup device according to the present embodiment.
Figure 9B:
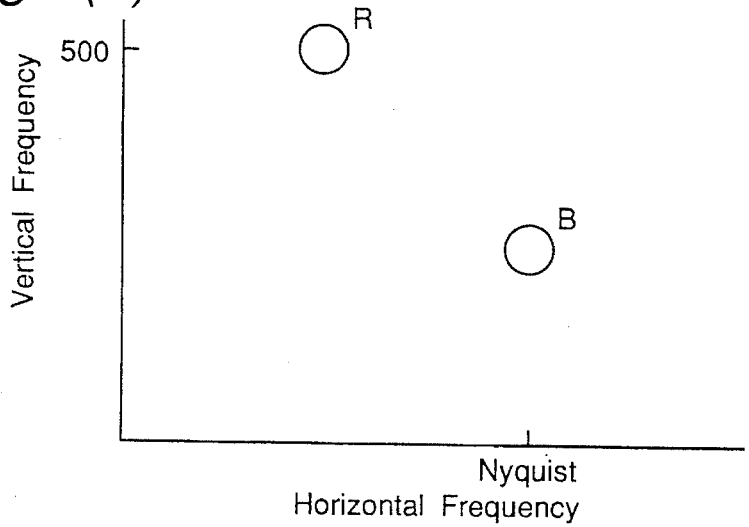
FIG. 9(b) is a view showing a two-dimensional frequency characteristic in the color filter array shown in FIG. 8(b)
Figure 9C:
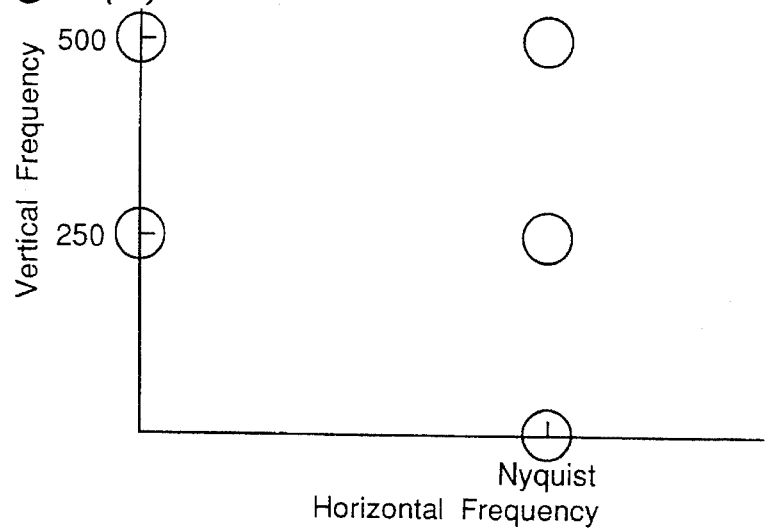
FIG. 9(c) is a view showing a two-dimensional frequency characteristic of the moire occurrence condition in the color filter array shown in FIG. 2.
Figure 9D:
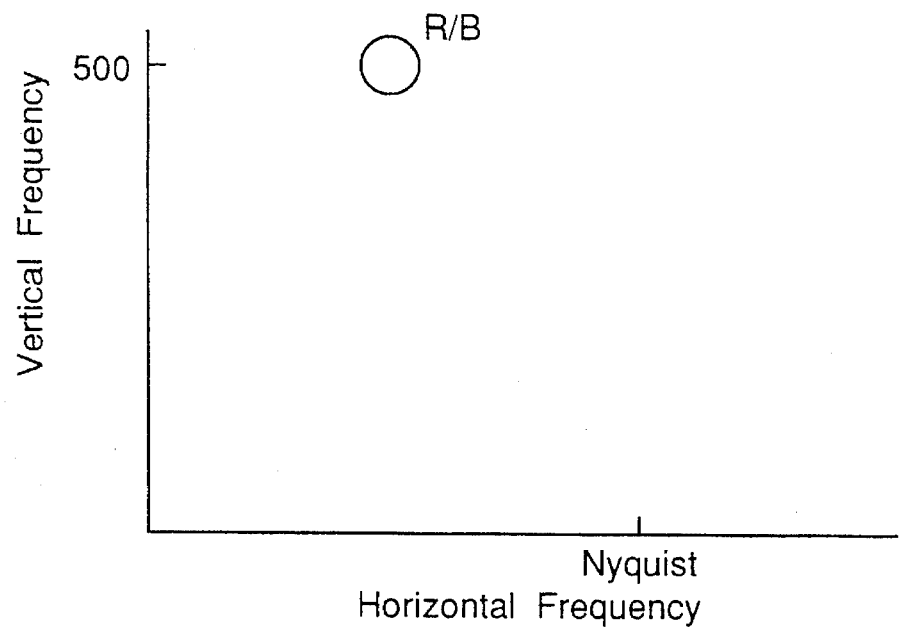
FIG. 9(d) is a view showing a two-dimensional frequency characteristic in the color filter array shown in FIG. 8(a)

Also, another filter array may be used in which the Nth row of color filters is composed of a repetition of arrangement of a first color filter, a second color filter, a third color filter, and a fourth color filter arranged in this order; the (N+1)th row of color filters is composed of a repetition of arrangement of a third color filter, a fourth color filter, a first color filter, and a second color filter arranged in this order, the two rows being disposed repetitively in the vertical direction. That is, a color filter array as shown in FIG. 8(a) may be selected. In this case, the chrominance moire pattern is as shown in FIG. 9(d).

Figure 8B:
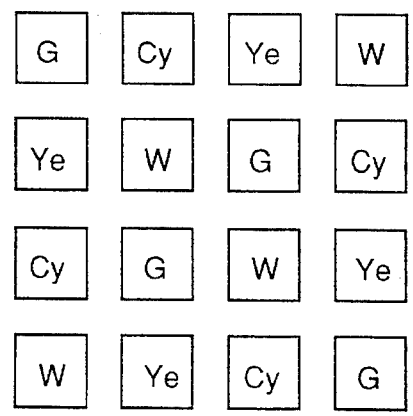
FIG. 8(b) is a model view showing another example of the color filter array of the solid-state image pickup device according to the present embodiment.
Figure 8C:
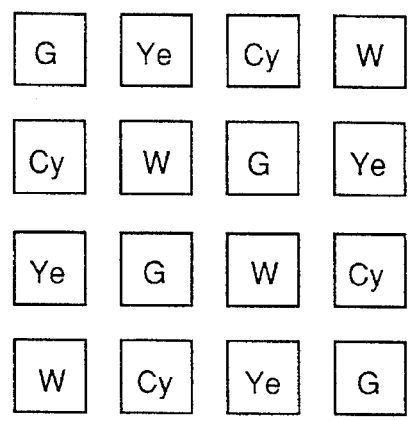
FIG. 8(c) is a model view showing still another example of the color filter array of the solid-state image pickup device according to the present embodiment.
Figure 9E:
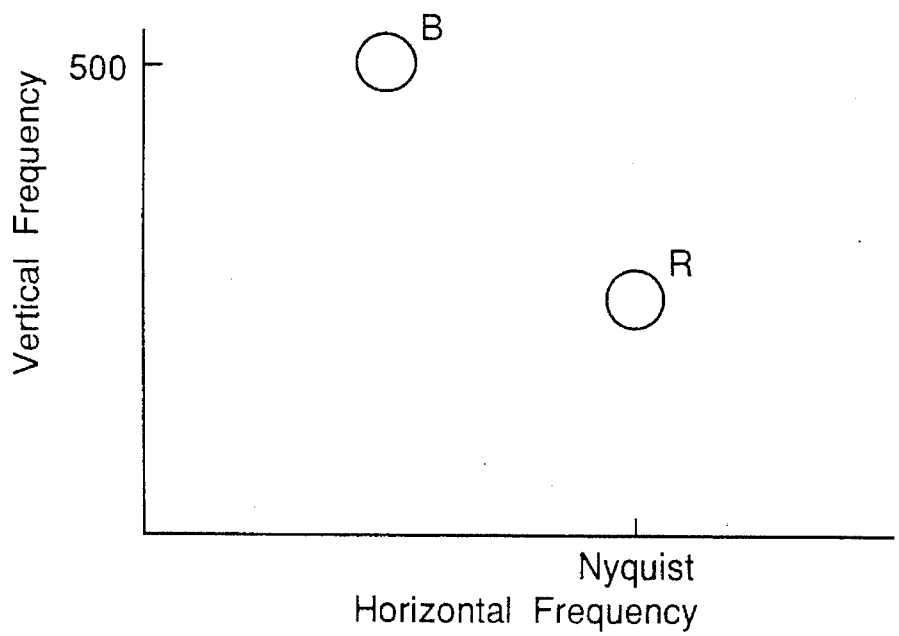
FIG. 9(e) is a view showing a two-dimensional frequency characteristic in the color filter array shown in FIG. 8(c)

Further, still another filter array may be used in which the Nth row of color filters is composed of a repetition of a first color filter, a second color filter, a third color filter, and a fourth color filter; the (N+1)th row of color filters is composed of a repetition of a third color filter, a fourth color filter, a first color filter, and a second color filter; the (N+2)th row of color filters is composed of a repetition of a second color filter, a first color filter, a fourth color filter, and a third color filter; the (N+3)th row of color filters is composed of a repetition of a fourth color filter, a third color filter, a second color filter, and a first color filter, the four rows being disposed repetitively in the vertical direction. That is, color filter arrays as shown in FIG. 8(b) and 8(c) may be selected. The moire pattern corresponding to FIG. 8(b) is as shown in FIG. 9(b) and the moire pattern corresponding to FIG. 8(c) is as shown in FIG. 9(e).

Figure 7A:
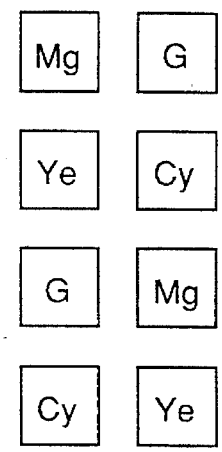
FIG. 7(a) is a model view showing an example of the color filter array of the solid-state image pickup device according to the present embodiment.
Figure 7B:
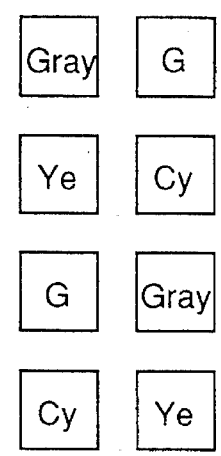
FIG. 7(b) is a model view showing another example of the color filter array of the solid-state image pickup device according to the present embodiment.

Although a white color is used for the color of color filters in the above embodiment, it is desirable to decrease the permeability of white color filter and make it grey to thereby keep a balance between photodiodes in output charge quantities. In this case, it is preferable that moire occurrence due to the use of grey may be suppressed by giving the color of grey a gain in the luminance signal processing unit 3 and the chrominance signal processing unit 4. Alternatively, magenta may be used in lieu of white as shown in FIG. 7(a).

Figure 2A:
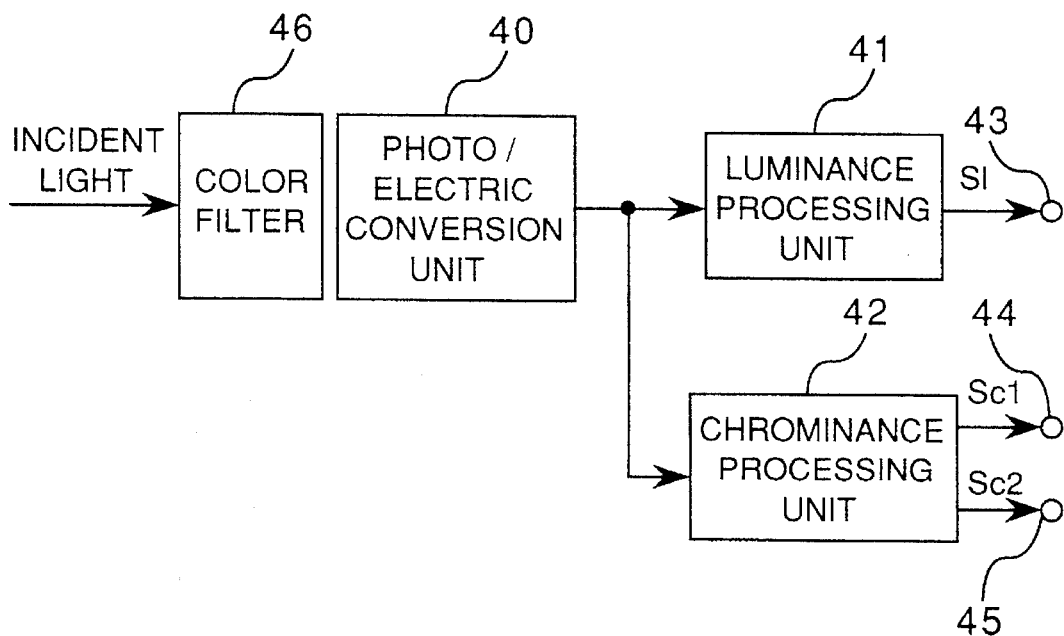
FIG. 2(a) is a block diagram showing an example of a conventional solid-state image pickup device.
Figure 2B:
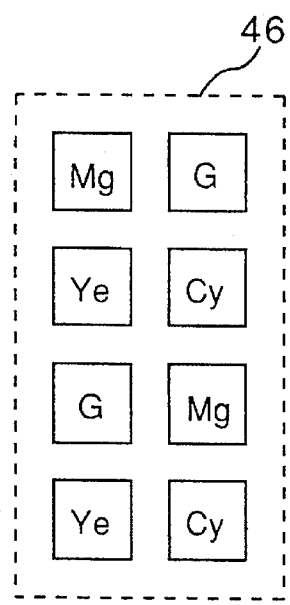
FIG. 2(b) is a model view showing a color filter array of the conventional solid-state image pickup device.

If the vertical resolution is permitted to decrease, the conventional color filter array as shown in FIG. 2(b) can be used.

In a solid-state image pickup device, an analog-to-digital conversion unit may be further provided between an all-pixel read-out type photoelectric conversion unit 1 and a memory unit 2, and the whole signal processing after the analog-to-digital conversion may be made digital signal processing.

Figure 10A:
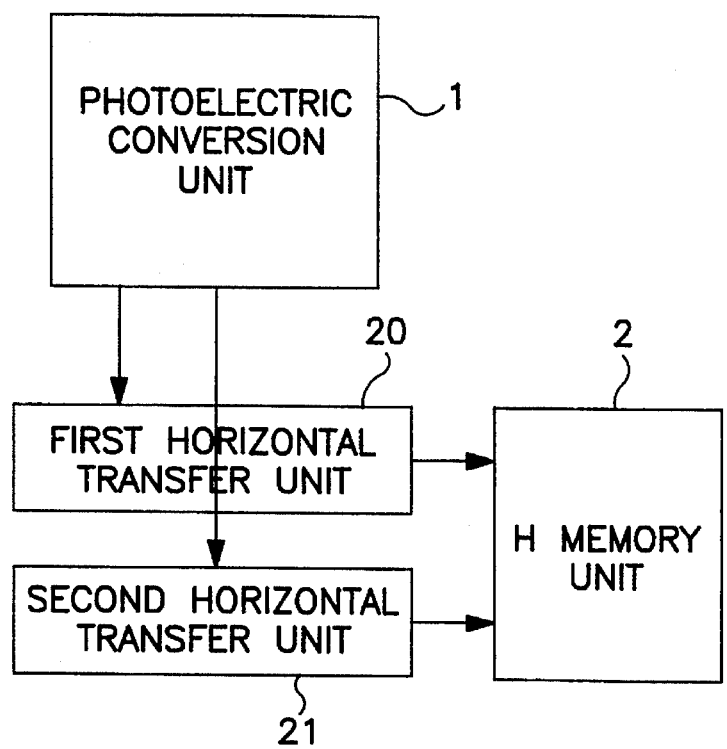
FIG. 10(a) is a block diagram showing an embodiment of an all-pixel concurrent read-out typed photoelectric conversion unit.
Figure 10B:
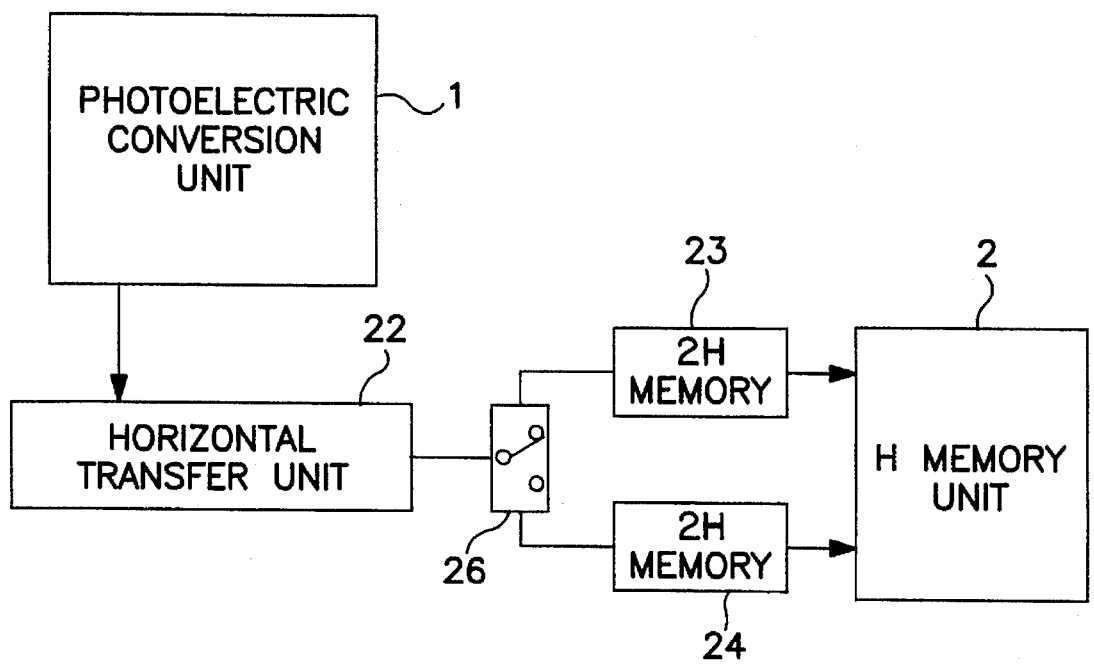
FIG. 10(b) is a block diagram showing another embodiment of an all-pixel concurrent read-out typed photoelectric conversion unit.

In connection with the all-pixel read-out type photoelectric conversion unit 1 used in the solid-state image pickup device, it is desirable that the photoelectric conversion unit 1 generates its output signal as dual signals to the H memory unit 2 through a first horizontal transfer unit 20 and a second horizontal transfer unit 21 as shown in FIG. 10(a). Alternatively, as shown in FIG. 10(b), a single horizontal transfer unit 22, a switch unit 26 and first and second 2H memories 23 and 24 may be also provided between the photoelectric conversion unit 1 and the H memory unit 2 thereby to feed signals from the photoelectric conversion unit 1 to the switch 26 which changes over for every signal of one row through the horizontal transfer unit 21, and to write in the first 2H memory 23 and second 2H memory 24 alternately with a rate that is twice as fast as the rate of an operating clock in the H memory unit 2, and to read out with the clock in the H memory unit 2 for the same processing as above.

It is preferable to employ a color selection optical low-pass filter 80 as a color filter array unit in the solid state image pickup device of the present invention.

According to the solid-state image pickup device of the present invention utilizing a single plate system, a higher resolution can be obtained in both horizontal and vertical directions than that in the conventional device together with less moire patterns by employing the above mentioned composition. The improvement in resolution can be applied to lowering the amount of aperture correction so as to avoid an S/N ratio degradation.

In addition, according to the present invention, there will not be caused any color breakup with field sequential scanning. Furthermore, since scanning line interpolation can be done, electron zooming or correction of deflection due to manual handling can be performed.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A solid state image pickup device, comprising:

color filter means having a color filter array composed by repetition of four rows such that, a N-th row is composed of a repetition of a first color filter and a second color filter, a (N+1)th row is composed of a repetition of a third color filter and a fourth color filter, a (N+2)th row is composed of a repetition of a second color filter and a first color filter as a reverse sequence to that of the N-th row in pixel arrangement, a (N+3)th row is composed of a repetition of a fourth color filter and a third color filter as a reverse sequence to that of a (N+1)th row in pixel arrangement, a group of the four rows being arranged repetitively in the vertical direction;

photoelectric conversion means of all-pixel concurrent read-out type for photo-electrically converting incident light data signals input passing through said color filter array;

memory means for storing the photo-electrically converted signals output from said photoelectric conversion means;

luminance signal processing means for producing a luminance signal from the output signal of said memory means to be generated from a first output terminal of said device, said luminance signal processing means has a low frequency band luminance signal producing unit, a horizontal high frequency band luminance signal producing unit, a vertical high frequency band luminance signal producing unit, and an adding means, said low frequency band luminance signal producing unit adds signals from vertically and horizontally adjoining pixels and feeds the output signal to said adding means, said horizontal high frequency band luminance signal producing unit extracts the horizontal high frequency component of signals obtained by adding vertically adjoining M pixels and feeds the output signal to said adding means, and said vertical high frequency band luminance signal producing unit extracts the vertical high frequency component of signals obtained by adding horizontally adjoining K pixels and feeds the output signal to the adding means, and signals added at the adding means are output as a luminance signal; and chrominance signal processing means for producing first and second chrominance signals from the output signal of said memory means to be respectively generated from second and third output terminals of said device.

2. A color filter array for use in a solid state image pickup device as set forth in claim 1, wherein an Lth row is composed of a repetition of the first color filter, the second color filter, the third color filter, and the fourth color filter, and an (L+1)th row is composed of a repetition of the third color filter, the fourth color filter, the first color filter, and the second color filter.

3. A color filter array for use in a solid state image pickup device as set forth in claim 1, wherein a Mth row is composed of a repetition of the first color filter, the second color filter, the third color filter, and the fourth color filter, a (M+1)th row is composed of a repetition of the third color filter, the fourth color filter, the first color filter, and the second color filter, and a (M+3)th row is composed of a repetition of the fourth color filter, the third color filter, the second color filter, and the first color filter.

4. The solid state image pickup device as set forth in claim 1, wherein said memory means comprises at least four 1H memories, among the output signals of said photoelectric conversion means, even row signals are fed to a first 1H memory, the output signal of the first 1H memory is fed to a second 1H memory, odd row signals are fed to a third 1H memory, the output signal of the third 1H memory is fed to a fourth 1H memory, and the input signal to the first 1H memory, the output signal from the first 1H memory, the output signal from the second 1H memory, the input signal to the third 1H memory, the output signal from the third 1H memory, and the output signal from the fourth 1H memory are fed to said luminance signal processing means and chrominance signal processing means.

5. The solid-state image pickup device as set forth in claim 1, wherein said chrominance signal processing unit is so arranged that a first and a second color difference signals for a first and second primary colors can be obtained simultaneously in a current field by arithmetic operations between adjoining pixels.

* * * * *